(12) United States Patent
Slezak

(10) Patent No.: US 6,647,119 B1
(45) Date of Patent: Nov. 11, 2003

(54) SPACIALIZATION OF AUDIO WITH VISUAL CUES

(75) Inventor: Mark R. Slezak, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/106,371

(22) Filed: Jun. 29, 1998

(51) Int. Cl.$^7$ ............... H04R 5/00; G09G 5/00
(52) U.S. Cl. ............ 381/17; 345/619; 345/650; 345/727; 700/94
(58) Field of Search ............... 463/31, 32, 35; 381/17; 345/973, 330, 348, 352, 340, 157, 619, 650, 727, 419

(56) References Cited

U.S. PATENT DOCUMENTS

| | | | |
|---|---|---|---|
| 5,026,051 A | 6/1991 | Lowe et al. ............... 273/435 |
| 5,052,685 A | 10/1991 | Lowe et al. ............... 273/460 |
| 5,138,660 A * | 8/1992 | Lowe et al. ............... 381/17 |
| 5,272,757 A * | 12/1993 | Scofield et al. ............ 381/25 |
| 5,291,556 A * | 3/1994 | Gale ........................ 348/14.08 |
| 5,436,975 A | 7/1995 | Lowe et al. ............... 381/17 |
| 5,448,287 A * | 9/1995 | Hull ......................... 348/39 |
| 5,473,343 A | 12/1995 | Kimmich et al. ........... 345/145 |
| 5,487,113 A | 1/1996 | Mark et al. ................ 381/17 |
| 5,534,887 A * | 7/1996 | Bates et al. ............... 345/727 |
| 5,768,393 A * | 6/1998 | Mukojima et al. ........... 381/17 |
| 5,862,229 A * | 1/1999 | Shimizu .................... 381/17 |
| 5,867,654 A * | 2/1999 | Ludwig et al. ............. 709/204 |
| 5,872,566 A * | 2/1999 | Bates et al. ............... 345/341 |
| 5,993,318 A * | 11/1999 | Kousaki .................... 463/35 |
| 6,040,831 A * | 3/2000 | Nishida .................... 345/340 |
| 6,046,722 A * | 4/2000 | McKiel, Jr. ............... 345/145 |
| 6,081,266 A * | 6/2000 | Sciammarella ............. 345/727 |
| 6,088,031 A * | 7/2000 | Lee et al. ................. 345/352 |
| 6,097,390 A * | 8/2000 | Marks ...................... 345/348 |
| 6,097,393 A * | 8/2000 | Prouty et al. .............. 345/419 |
| 6,122,381 A * | 9/2000 | Winterer ................... 381/1 |

* cited by examiner

*Primary Examiner*—Forester W. Isen
*Assistant Examiner*—Brian T. Pendleton
(74) *Attorney, Agent, or Firm*—Westman, Champlin & Kelly (57) ABSTRACT

A method of providing information to a computer user includes displaying separate visual cues of the information on a computer monitor. A simulated sound source is generated for each separate visual cue displayed on the computer monitor. The simulated sound sources are spaced-apart from each other about the computer user.

13 Claims, 10 Drawing Sheets

SPACIALIZATION OF AUDIO WITH VISUAL CUES

BACKGROUND OF THE INVENTION

The present invention relates to computer systems. More particularly, the present invention relates to generating audio signals to simulate sound sources that are stationary and moving proximate a computer display.

With advances in technology including faster processors and larger screen displays, a computer can provide a large amount of visual information to the user. Commonly, the user may be working in one application, such as a database program, in one portion of the screen, while other portions of the screen display other information such as related to scheduling programs and/or electronic mail programs. If, while working in the database program, the user receives mail or is reminded of an appointment, a dialog box, or some other form of visual cue is displayed. The visual cue may be accompanied by an audible tone or chime played over the speakers. The user will then have to locate the visual cue, and ascertain its meaning. If upon examination, the user decides immediate action is not warranted, the user can then return his or her attention back to the database program. Nevertheless, the visual cue and audible tone or chime could have been a distraction since only upon examination will the user determine if immediate action is warranted. The problem is compounded if the user is working with multiple screens since it may take longer to find the visual cue amongst the various information being displayed by all of the screens.

Advances in technology have also provided enhanced sound that has been used in computerized game application. Commonly, threats from unseen game opponents can be played through the computer speakers in a manner to make them appear as if they are behind the user. For example, in a 3D game for fighter plane combat, the game designer might want an enemy jet to fly past from left to right and behind the player. To simulate this action, the sound is presented to the player as if the source (i.e., the enemy jet) is moving in 3-dimensional space just behind them from left to right.

There is a continuing need to improve the interface between the computer user and information displayed on a screen so as to draw attention from the user when immediate action may be warranted but not provide repeated distractions.

SUMMARY OF THE INVENTION

A first broad aspect of the present invention includes a method of providing information to a computer user that includes displaying separate visual cues of the information on a computer monitor. A simulated sound source is generated for each separate visual cue displayed on the computer monitor. The simulated sound sources are spaced-apart from each other about the computer user.

A second broad aspect of the present invention includes a method of positioning simulated sound sources in relation to a computer user. The method includes displaying a graphical representation including an indicator for each of the simulated sound sources. The graphical representation shows the spaced relation of the simulated sound sources. The computer user can move a simulated sound source by moving the corresponding indicator in the graphical representation.

A third broad aspect of the present invention includes a game operable on a computer having an input device and speakers for generating three dimensional sound. The game includes traversing a path using the input device and generating three dimensional sound as a function of movement of the path. The game operator navigates the path using primarily the three dimensional sound.

DETAILED DESCRIPTION OF THE PREFERRED EMBODIMENTS

Figure 1:
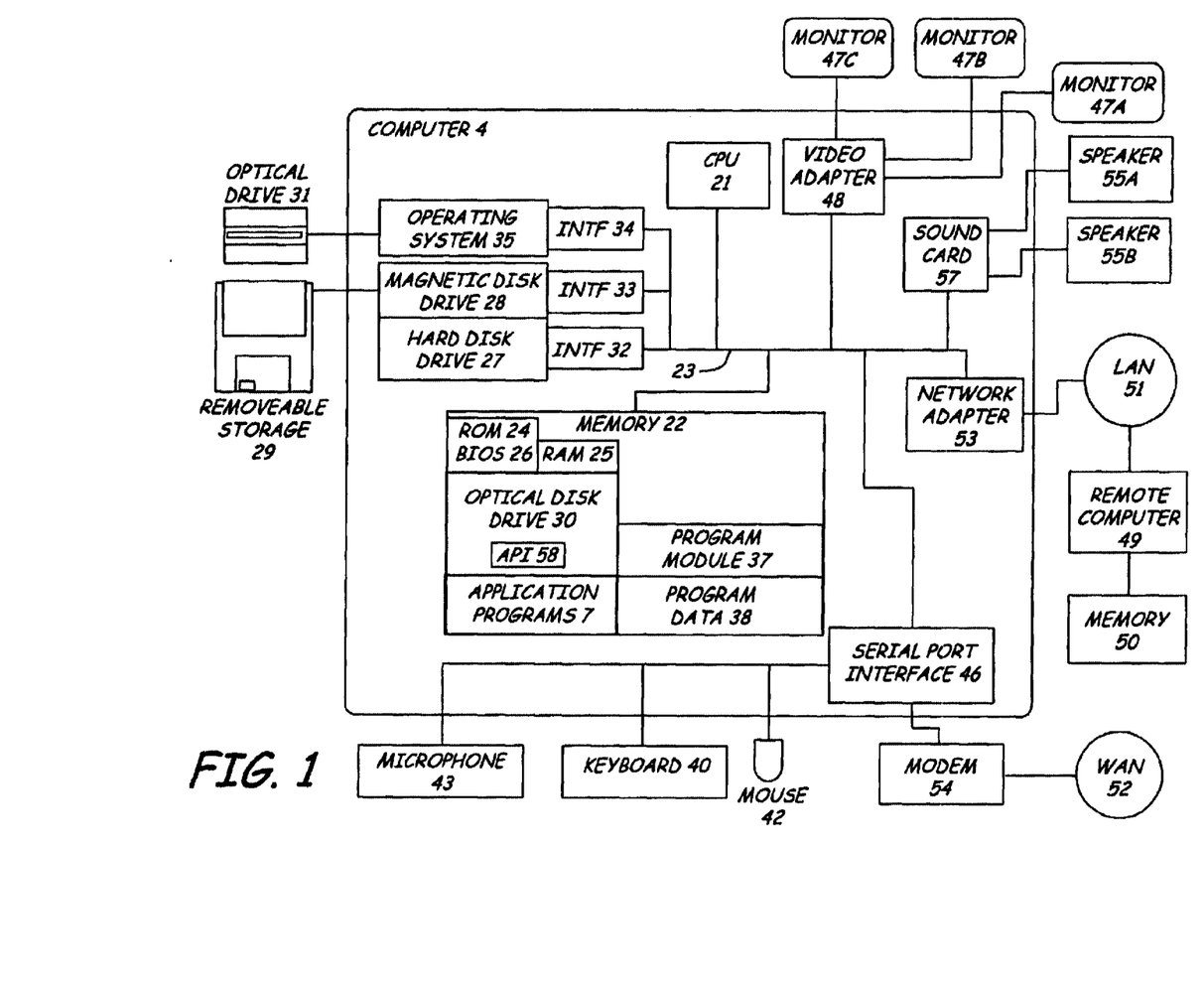
FIG. 1 is a block diagram of a computing environment for use in the present invention.

Before describing aspects of the present invention, a brief description of a suitable computer environment, will be helpful. FIG. 1 and the related discussion are intended to provide a brief, general description of a suitable computing environment in which the invention may be implemented. Although not required, the invention will be described, at least in part, in the general context of computer-executable instructions, such as program modules, being executed by a desktop computer 4. Generally, program modules include routine programs, objects, components, data structures, etc., that perform particular tasks or implement particular abstract data types. Moreover, those skilled in the art will appreciate that the invention may be practiced with computer system configurations, including handheld devices, such as palmtop computers, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal or desktop computer 4, including a computer processing unit (CPU) 21, a system memory 22, and a system bus 23 that couples various system components including the system memory 22 to the processing unit 21. The system bus 23 can be any of several types of bus structures including a memory bus or memory controller, a peripheral bus, and a local bus using any of a variety of bus architectures. The system memory 22 includes read only memory (ROM) 24 and random access memory (RAM) 25. A basic input/output system (BIOS) 26, containing the basic routine that helps to transfer information between elements within the desktop computer 4, such as during start-up, is stored in ROM 24. The desktop computer 4 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and the associated computer-readable media provide non-volatile storage of computer readable instructions, data structures, program modules and other data for the desktop computer 4.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, can also be used in the exemplary operating environment.

A number of program modules can be stored on the hard disk, magnetic disk 29, optical disk 31, ROM 24 or RAM 25, including an operating system 35, one or more of the application programs 7, other program modules 37, and program data 38. A user can enter commands and information into the desktop computer 4 through input devices such as a keyboard 40, a pointing device 42 and a microphone 43. Other input devices (not shown) can include a joystick, game pad, satellite dish, scanner, or the like. These and other input devices are often connected to the processing unit 21 through a serial port interface 46 that is coupled to the system bus 23, but can be connected by other interfaces, such as a sound card, a parallel port, a game port or a universal serial bus (USB). A monitor 47A or other type of display device is also connected to the system bus 23 via an interface, such as a video adapter 48. In other environments, additional monitors 47B and 47C can also be present. Video adapters couple the monitors 47B and 47C to the system bus 23. In the embodiment illustrated, these adapters are also illustrated at 48. In addition to the monitor 47A, desktop computer 4 can include other peripheral output devices, such as speakers 55A and 55B coupled to the system bus 23 through a sound card 57. The speakers 55A and 55B are positioned proximate one or all of the monitors 47A–47C to realize specialization as discussed below.

The desktop computer 4 can operate in a wired or wireless networked environment using logic connections to one or more remote computers, such as a remote computer 49. The remote computer 49 can be another personal computer, a server, a router, a network PC, a peer device or other network node, and typically includes many or all of the elements described above relative to the desktop computer 4, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets and the Internet.

When used in a LAN networking environment, the desktop computer 4 is connected to the local area network 51 through a network interface or adapter 53. When used in a WAN networking environment, the desktop computer 4 typically includes a modem 54 or other means for establishing communications over the wide area network 52, such as the Internet. The modem 54, which can be internal or external, is connected to the system bus 23 via the serial port interface 46. In a network environment, program modules depicted relative to the desktop computer 4, or portions thereof, can be stored in the remote memory storage devices, not shown. It will be appreciated that the network connections shown are exemplary and other means of establishing a communications link between the computers may be used. In the embodiment illustrated, the mobile device 3A also connects to the desktop computer 4 through the serial port interface 46.

Figure 2:
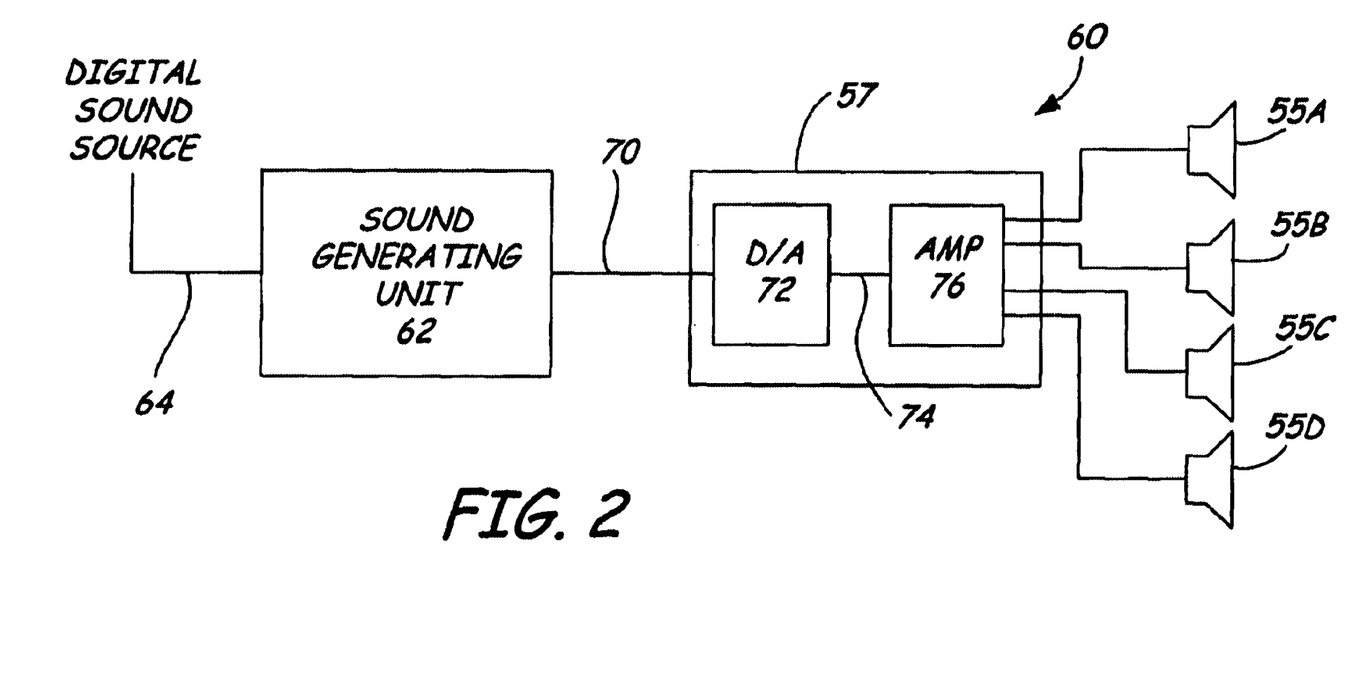
FIG. 2 is a block diagram of an audio signal processing system.

The desktop computer 4 runs the operating system 35 that is stored in any of the memory storage devices illustrated in FIG. 2 and executes on the processing unit 21. One suitable operating system is a Windows brand operating system sold by Microsoft Corporation, such as windows 95 or Windows NT, or other derivative versions of Windows brand operating systems, or another suitable operating system. Other suitable operating systems include systems such as Macintosh OS sold by Apple Corporation, and the OS/2 Presentation Manager sold by International Business Machines (IBM).

The operating system 35 supports operation of multiple application programs 7. As an example, the application 7 might be a scheduler program, an electronic mail program, a database program, or any number of other application programs commonly available. When launched, the application 7 runs on the operating system 35 while executing on the CPU 21. The operating system 35 supports an application program interface (API) 58 for facilitating 3D sound generation. The API 58 specifies the interface between the application 7 and the system software which implements the functionality specified by the API 58. The application 7 calls the 3D sound API 58 to produce the desired sound, including moving simulated sound sources.

FIG. 2 illustrates an audio signal processing system 60 that includes a sound generator unit 62, the sound card 57 and the speakers 55A and 55B. In one embodiment, the sound generator unit 62 includes various filters to process a digital audio signal 64 received from a sound source. The source itself may be live or prerecorded, such as a signal received from a CD-ROM, digital video disk, cassette, or stored digital representations in any of the memory devices discussed above in FIG. 1 on the desktop computer 4. The sound generator unit 62 is well known and can be implemented in hardware, software or a combination of hardware and software. As one example, the sound generator unit 62 can be implemented using a digital signal processor (DSP). In another implementation, the sound generator unit 62 is implemented in software that executes on the CPU 21 of the desktop computer 4, for example, as a part of or accessible from the operating system 35. In one exemplary embodiment, the sound generator unit 62 employs infinite impulse response (IIR) filters to filter the audio signals. The IIR filters have filter coefficients that change when the simulated sound source is stationary or moves from one location to the next in the 3D space. This embodiment is described in co-pending application entitled "INFINITE IMPULSE RESPONSE FILTER FOR 3D SOUND WITH TAP DELAY LINE INITIALIZATION" filed Aug. 13, 1997, and assigned Ser. No. 08/910,284, now U.S. Pat. No. 5,835,895 which is hereby incorporated by reference in its entirety.

In the embodiment illustrated, the sound generator unit 62 is implemented at least in part with software that provides as an output 70 digital representations of the audio signals to be played through the speakers 55A and 55B. In this exemplary embodiment, the sound card 57 includes a digital-to-analog (D/A) converter 72, which converts the digital audio signals 70 to analog signals represented at 74. An amplifier 76 amplifies the analog signals 74 and provides them to at least speakers 55A and 55B to simulate sound sources as stationary and/or moving in 3D space. It should be understood that although illustrated wherein sound sources in 3D space have been generated using the sound generator unit 62 and sound card 57, this is only but one embodiment since other suitable processing systems 60 can be used. Furthermore, if desired, additional speakers 55C and 55D can be positioned about the user in addition to the speakers 55A and 55B. Likewise, although illustrated herein with speakers 55A–55D, headphones can also be used and worn by the user.

Figure 3:
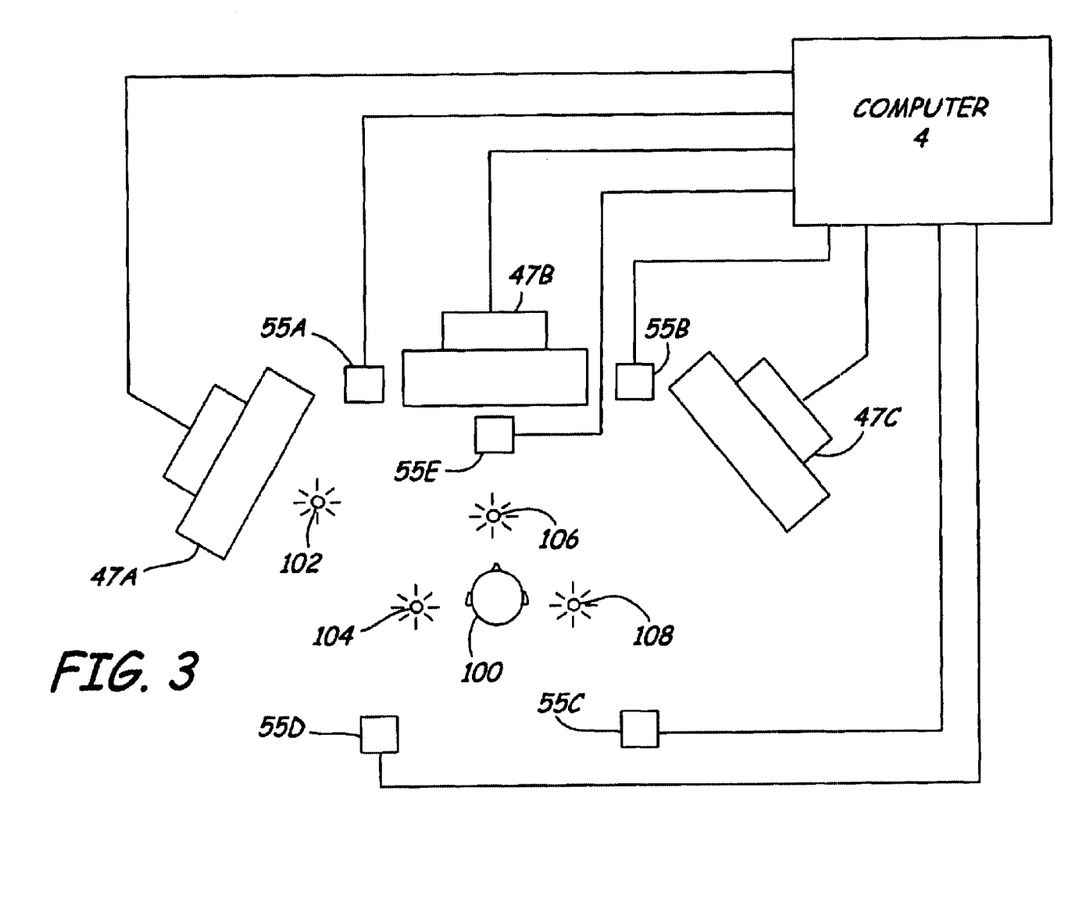
FIG. 3 is a block diagram of a multiple monitor embodiment of the present invention.

FIG. 3 illustrates a multiple monitor embodiment of the present invention. In FIG. 3, the monitors 47A–47C are positioned proximate each other for substantially simultaneous viewing by a user 100. The monitors 47A–47C display different visual information to the user 100 pursuant to the single or multiple applications being executed on the desktop computer 4. For instance, monitor 47A can be operated to display personal information such as electronic mail and/or scheduler information for the user 100, while monitor 47B is operated to display visual information pursuant to a database application or word processor application. Monitor 47C can be operated to display yet further information from a different application being executed by the desktop computer 4. For instance, monitor 47C can display time-critical information such as an application that monitors current stock values being traded in a stock market. In this exemplary embodiment, the user 100 may be working directly with the database or wordprocessor application being displayed via the monitor 47B when relevant information may be displayed on either the monitor 47A or the monitor 47C. In prior art systems, the user 100 would need to rely on noticing visual cues being displayed on monitors 47A or 47C in order to realize that relevant information is being displayed thereon. One aspect of the present invention includes spacialization of audio in conjunction with the visual cues in order to direct the attention of the user 100 to possibly relevant information. In the embodiment illustrated, the speakers 55A–55D are positioned about the user 100 in a manner to selectively simulate sound sources about the user 100 in conjunction with visual cues provided by the monitors 47A–47C. For instance, the speakers 55A–55D can be operated to simulate a sound source 102, for example, a bell, tone or chime, in front of the monitor 47A when the user 100 receives a new electronic message via the electronic mail program being executed on the desktop computer 4. Location of the sound source 102 in front of the monitor 47A thereby directs the attention of the user 100 to the monitor 47A whereupon a visual cue displayed thereon also indicates that a new message has been received.

Similarly, a sound source 104 can be generated by the speakers 55A–55D in a position spaced-apart from the simulated sound source 102 to alert the user 100 of other information. For instance, the simulated sound source 104 can be positioned, for example, proximate the left ear of the user 100. Operation of the speakers 55A–55D to simulate the sound source 104 can be done in conjunction with a visual cue on the monitor 47A to remind the user 100 of a prior scheduled appointment.

The use of selectively positioned simulated sound sources can easily direct the attention of the user 100 to the appropriate monitor where visual cues are being displayed in order to render information to the user 100. The selectively positioned simulated sound sources also allow the user 100 to easily ascertain what information the desktop computer 4 is attempting to provide the user 100. In this manner, the user 100 can continue working on a particular task since the user 100 has received some indication as to the type of information being presented on the monitor due to the location of the simulated sound source. In addition to separation of the simulated sound sources 102 and 104, each of the sound sources 102 and 104 can have different audible characteristics such as different notes, a combination of different notes, duration and/or other audible characteristics to further differentiate to the user the location of the simulated sound source or the information represented by the simulated sound source.

In the embodiment illustrated in FIG. 3., additional simulated sound sources 106 and 108 can be generated by the speakers 55A–55D in conjunction with information provided by the monitors 47B and 47C. For instance, the simulated sound source 106 placed between the user 100 and the monitor 47B can be used for audible indications generated by the word processor displaying information on the monitor 47B. Likewise, the simulated sound source 108 can be positioned proximate the right ear of the user 100 and be generated by the speakers 55A–55D when important stock information is being displayed on the monitor 47C that the user may want to examine. Although illustrated in FIG. 3 where multiple monitors 47A–47B are used to display information, spaced-apart simulated sound sources 102, 104, 106 and 108 can also be used with a single monitor to display information from one or several applications.

It should be noted that the use of four speakers 55A–55D is but one embodiment capable of generating simulated sound sources selectively in the space about the user 100. If desired, three speakers can be used to generate simulated sound sources. In one alternative embodiment, a speaker 55E is positioned in front of the user 100 and replaces the speakers 55A and 55B. Likewise, more than four speakers can also be used.

Figure 4:
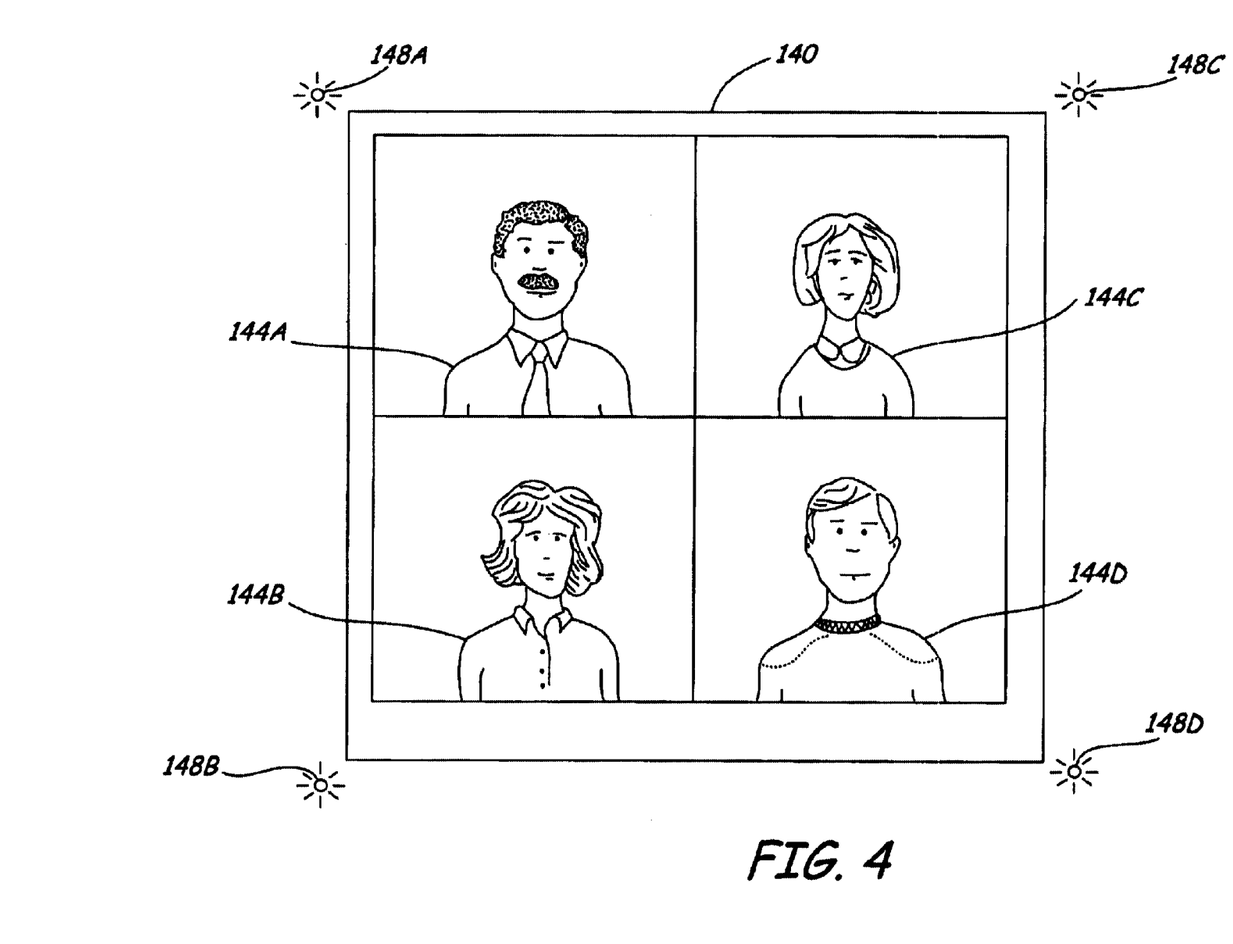
FIG. 4 is a pictorial illustration of a virtual meeting.

FIGS. 4–10 illustrate other aspects of the present invention wherein stationary or moving simulated sound sources are used in conjunction with visual cues provided on a single monitor in order to enhance understanding of the displayed information and improve user interaction. FIG. 4 illustrates a "virtual" meeting. In a virtual meeting, some or all of the participants in the meeting are located at remote locations. Each participant in the meeting preferably can see a monitor 140 that displays some or all of the other participants in isolated portions of the screen display. In the embodiment illustrated, the virtual meeting comprises five participants. A first participant can see the monitor 140, while each of the other participants indicated at 144A, 144B, 144C and 144D are displayed in each of the four quadrants of the monitor 140. Preferably, the four participants 144A–144D are displayed in real time wherein a camera located proximate each of the participants 144A–144D captures a visual image of the participants 144A–144D and transmits a corresponding image to each of the other participants substantially irk real time. If desired, stationary images of the participants 144A–144D can be used or other visual indications can be provided on the monitor 140 to represent each of the participants 144A–144D.

In addition to preferably a camera located proximate each participant 144A–144D, a microphone is also provided to capture and provide an audio signal for each of the participants 144A–144D. The audio signals and the video signals, if present, are transmitted to each of the participants 144A–144D using known communication methods and protocols over a local, Intranet or Internet system. In this aspect of the present invention, simulated sound sources 148A, 148B, 148C and 148D are generated by spaced-apart speakers or headphones to associate each respective audio signal with the visual indication of the participant 144A–144D provided on the monitor 140. For instance, the simulated sound sources 148A–148D are generated proximate each respective corner of the monitor 140 closest to the visual images of the participants 144A–144D. In this manner, the user viewing the monitor 140 can easily discriminate or associate the audio signal received and transmitted through the speakers with the corresponding participant that is talking. The location and orientation of the simulated sound source for each of the participants 144A–144D can be varied as desired proximate the monitor 140 and ii) the 3D space surrounding the user as a function of the number of participants in the meeting and their arrangement on the monitor 140.

Figure 5:
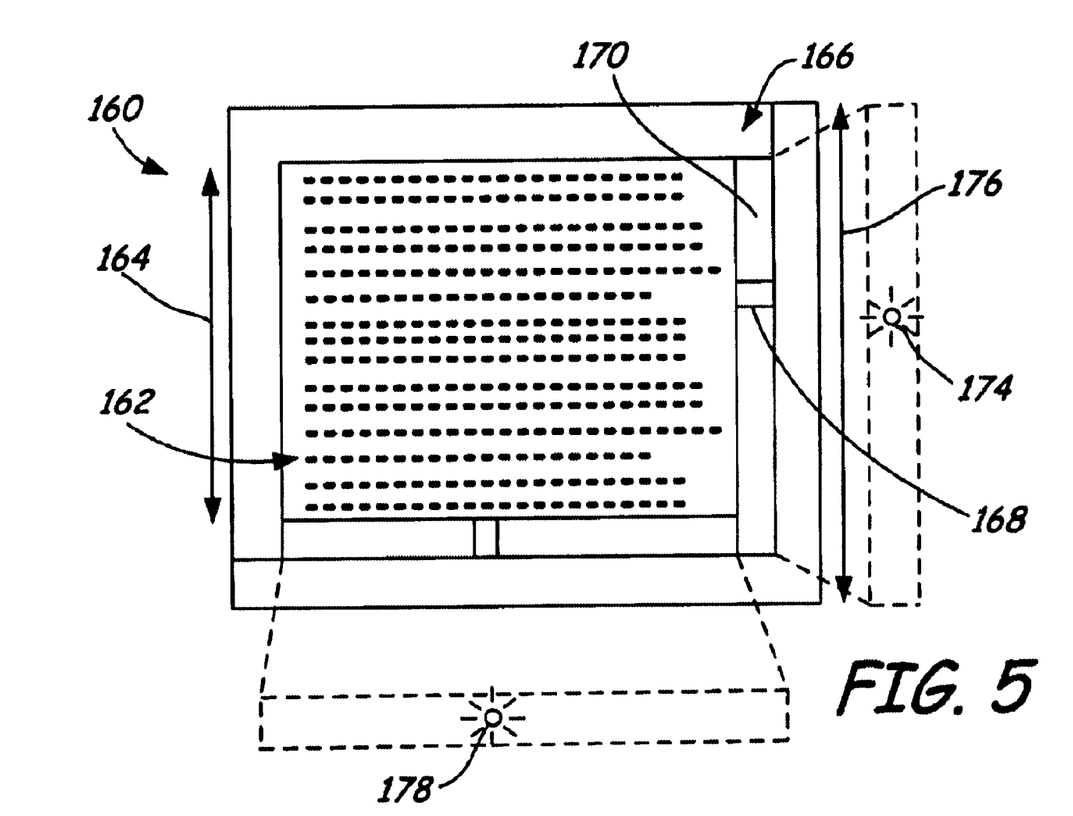
FIG. 5 is a pictorial illustration of a simulated sound source used with a scroll bar.

FIG. 5 illustrates a monitor 160 for displaying information 162. In this embodiment, the information 162 is of length such that it can not be completely displayed by the monitor 160 in its entirety. In other words, the information 162 has a vertical length that exceeds a vertical length 164 of the monitor 160. As is common practice in the art, when the information 162 to be displayed on the monitor 160 exceeds the vertical length 164 of the monitor 160, a scroll bar 166 is displayed on the edge of the monitor 160. The scroll bar 166 extends the vertical length 164 of the monitor 160 and includes an indicator 168 that moves in accordance with the information 162 displayed on the monitor 160. In particular, the position of the indicator 168 relative to a stationary background field 170 of the scroll bar 166 changes in association with the approximate viewing position within information 162.

Another aspect of the present invention includes providing a simulated sound source 174 that approximately tracks the position of the indicator 168 in the scroll bar 166. In the embodiment illustrated, the simulated sound source 174 provides periodic audible tones, or chimes. The simulated sound source 174 moves vertically along a path 176 that, in this embodiment, is longer than the vertical length 164 of the scroll bar 166. If desired, the path 176 of movement of the simulated sound source 174 can be approximate or less than the vertical length 164 of the scroll bar 166. Simulated movement of the sound source 174 along the path 176 provides an audible indication to the user of his or her position within the information 162. Audibile indications from the simulated sound source 174 can be provided when the indicator 168 moves with respect to the background field 170, and/or periodic audible indications can be provided even if the indicator 168 does not move in order to remind the user of his or her position. It should be noted that a simulated sound source 178 can also be provided to indicate the user's position in the information 162 if such information exceeds the horizontal capabilities of the monitor 160. In the embodiment illustrated the simulated sound source 174 is positioned along side the monitor 160, while the simulated sound source 178 is positioned between the user and the monitor 160.

Figure 6A:
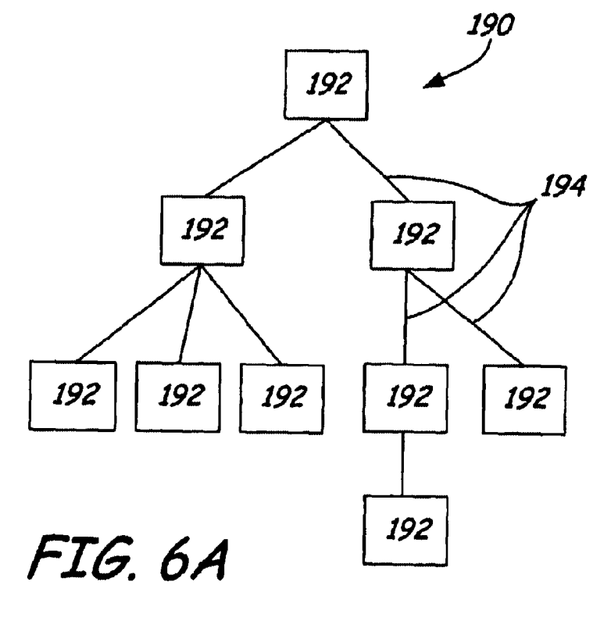
FIGS. 6A and 6B are pictorial illustrations of a simulated sound source used with structural information displayable on a monitor.

FIG. 6A is a pictorial representation of information 190 comprising sub-elements 192 organized in a particular structure wherein each of the sub-elements 192 are separately viewable on the monitor 160 described above. For example, the sub-elements 192 can be hyper text mark-up language (HTML) pages that are rendered on the monitor 160 when a user browses a site of information that is available through an Intranet or the Internet. In the representation of FIG. 6A, links 194 represent virtual paths between the sub-elements 192 that a user navigates with the browser. Typically, the user can navigate through the information 190 by activating highlighted text displayed on the monitor 160 or using other graphical buttons provided when each of the sub-elements 192 are displayed.

Figure 6B:
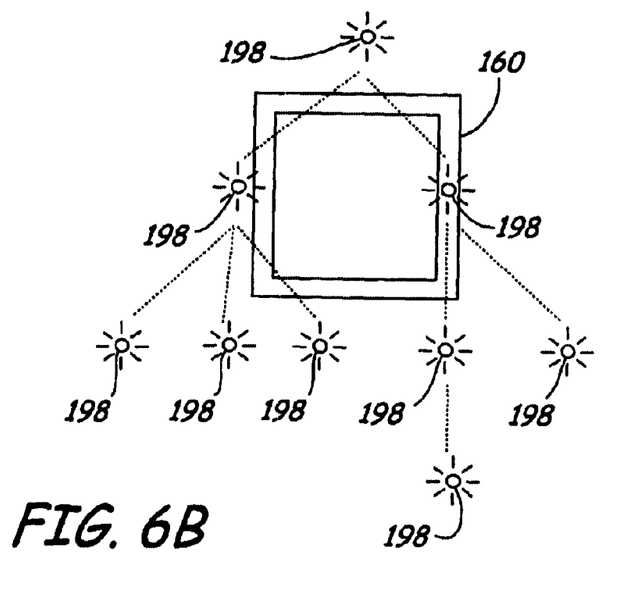

Referring to FIG. 6B, a simulated sound source 198 moves in the 3D space surrounding the user, for instance, in a plane between the user and the monitor 160 in a manner that approximates the organization of the information 190 that is available to be viewed. In this manner, as the user navigates through the information 190 to display each of the various sub-elements 192 available, the simulated sound source 198 also moves and provides audible indications to the user of his or her position.

Figure 7:
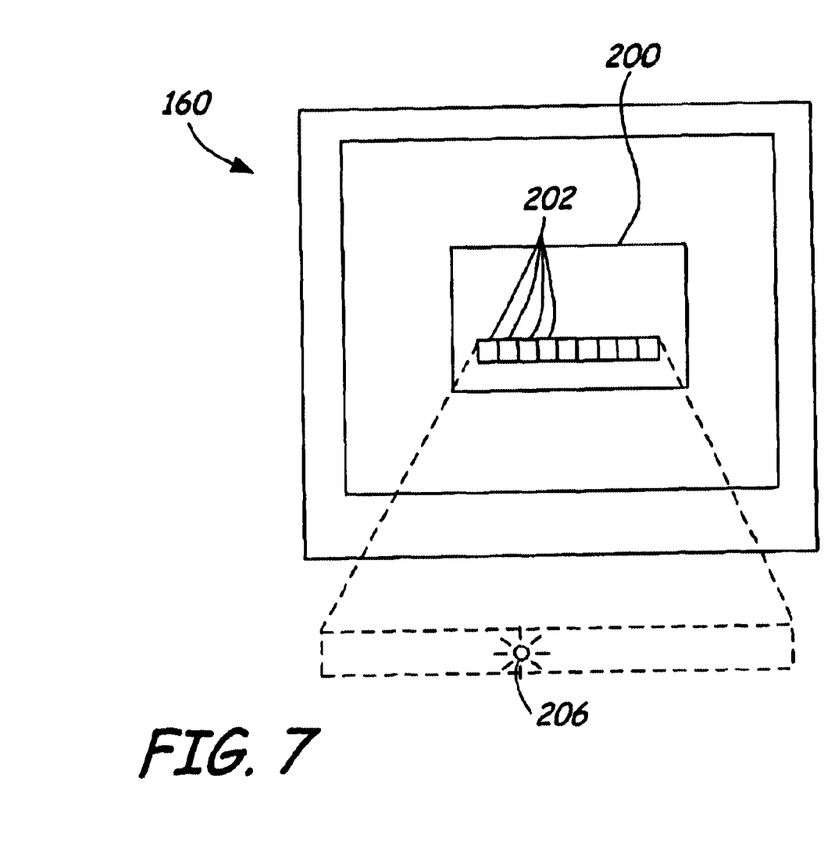
FIG. 7 is a pictorial illustration of a simulated sound source used with a status dialog box.

FIG. 7 illustrates a dialog box 200 displayed on the monitor 160 during operation of an application on the desktop computer 4. Such dialog boxes are commonly used in applications to convey information pertaining to operation of the program as an action is being performed. Typically such actions may take a number of seconds or minutes to complete. The dialog box 200 provides a visual indication that the program is completing the action.

In the embodiment illustrated, the dialog box 200 provides a series of visual blocks 202 that increase in number from left to right as the action is completed. Another aspect of the present invention is providing a simulated sound source 206 that moves in the 3D space surrounding the user in accordance with the visual cue provided on the monitor 160. In this embodiment, the simulated sound source 206 is located in between the user and the monitor 160. The simulated sound source 206 moves from left to right in front of the user in accordance with the number of blocks 202 being displayed on the monitor 160. Movement of the simulated sound source 206 in accordance with the dialog box 200 being displayed on the monitor 160 reinforces to the user the current status of the action being performed by the desktop computer 4. In addition the user need not constantly monitor the dialog box 200 in order to ascertain the status. In other words the user can perform other tasks while the action is being performed by the desktop computer 4 because the user can simply monitor the position of the simulated sound source 206 in 3D space in order to monitor completion of the action task. Although described above with respect to movement of the simulated sound source 206 from left to right in front of the user, it should be noted that other forms of movement of the simulated sound source 206, for example, in an arc or a circle can also be used.

Figure 8:
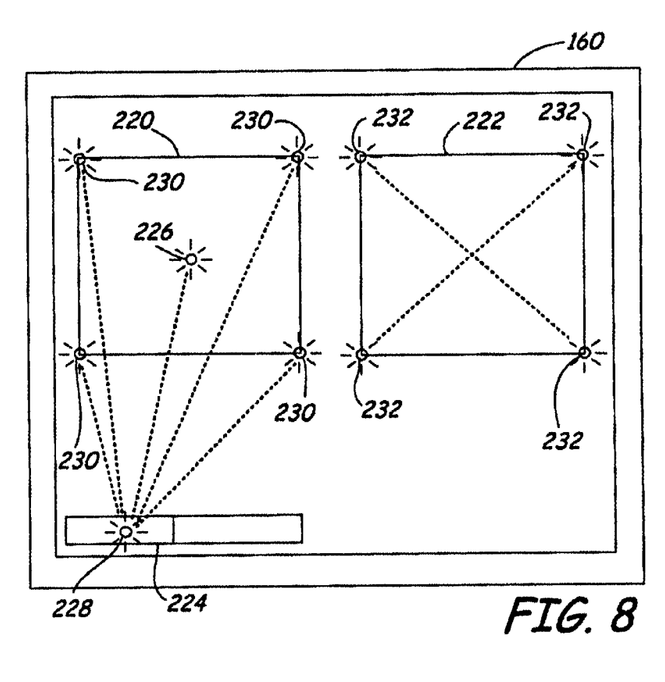
FIG. 8 is a pictorial illustration of a simulated sound source used with multiple applications.

FIG. 8 illustrates another exemplary embodiment of the present invention. In this embodiment, application programs are displayed to the user only using a portion of the screen display of the monitor 160. This type of visual interface is commonly used and available through operating systems such as Windows NT or windows 95 sold by Microsoft Corporation. In FIG. 8 information pursuant to a first application is displayed to the user on the monitor 160 within a portion 220, while information pursuant to a second application is displayed in a portion 222. By using an interactive pointer device such as a mouse, the user can activate one of the applications. Sometimes, the user may want to minimize the graphical display provided by the application program. In such cases, the user activates a suitable button provided in the portion 220 in which case, the portion 220 will appear to reduce to a smaller portion 224. In order to reinforce or emphasize to the user that minimization has occurred, one aspect of the present invention includes providing a simulated sound source 226 in the 3D space between the user and the monitor 160 that moves in a manner that approximates reduction of the portion 220 to the portion 224. In particular, when the portion 220 is minimized to the portion 224, the simulated sound source 226 appears to move from its position shown to a new position 228. Likewise, when the user restores portion 220 from the portion 224, the simulated sound source returns to the position indicated at 226 from the position 228. As an alternative embodiment, multiple simulated sound sources indicated at 230 can be used. In this embodiment, the multiple simulated sound sources 230 will converge to the position 228 when the portion 220 is minimized to the portion 224. Likewise, when the portion 220 is stored at the portion 224, the multiple simulated sound sources 230 appear to expand outwardly from the position 228 to the position shown.

With respect to portion 222, multiple simulated sound sources 232 are also provided, for example, positioned at each of the corners representing the viewable extent of the portion 222. When the application program is terminated and the portion 222 disappears, the multiple simulated sound sources 232 appear to converge toward each other in order to emphasize to the user that the application has been closed.

Figure 9:
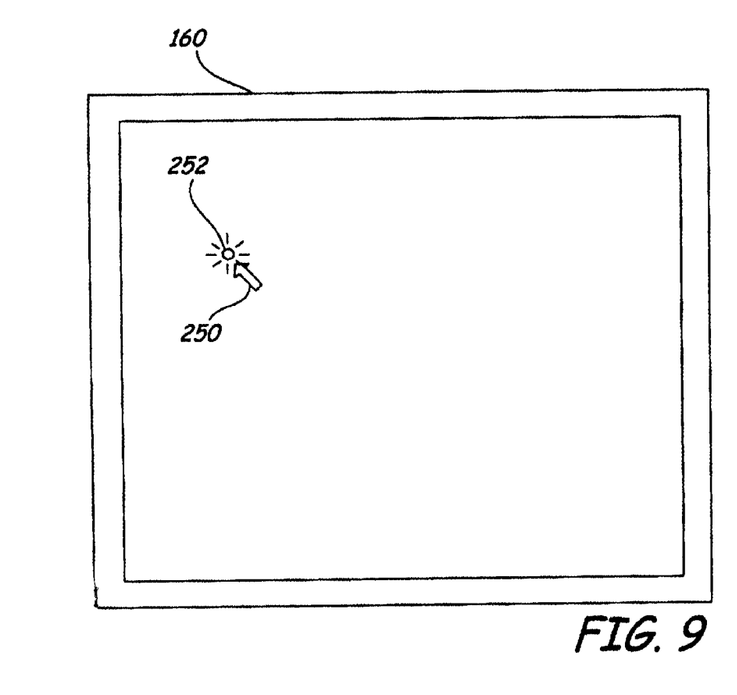
FIG. 9 is a pictorial illustration of a simulated sound source used with a cursor representation.

FIG. 9 illustrates another aspect of the present invention. In FIG. 9, the monitor 160 includes a cursor representation 250. The cursor representation 250 moves within the screen boundaries in accordance with operation of a pointing device such as a mouse, joystick or roller ball. Typically, the cursor representation 250 is much smaller than the screen display of the monitor 160, which makes the cursor representation 250 sometimes difficult to locate. Often times, the user will have to jiggle the pointing device in order to cause movement of the cursor representation 250 so that the user can locate the cursor representation 250. Another aspect of the present invention includes generating a simulated sound source 252, for example, in a manner that approximates the position of the cursor representation 250 on the monitor 160. For instance, the simulated sound source 252 can be generated in a plane between the user and the monitor 160. The position of the cursor representation 250 relative to the screen display of the monitor 160 is known to applications and the operating system running on the desktop computer 4. Using this information, the desktop computer 4 can generate the simulated sound source 252 in an appropriate position so as to draw the attention of the user toward the cursor representation 250.

Figure 10:
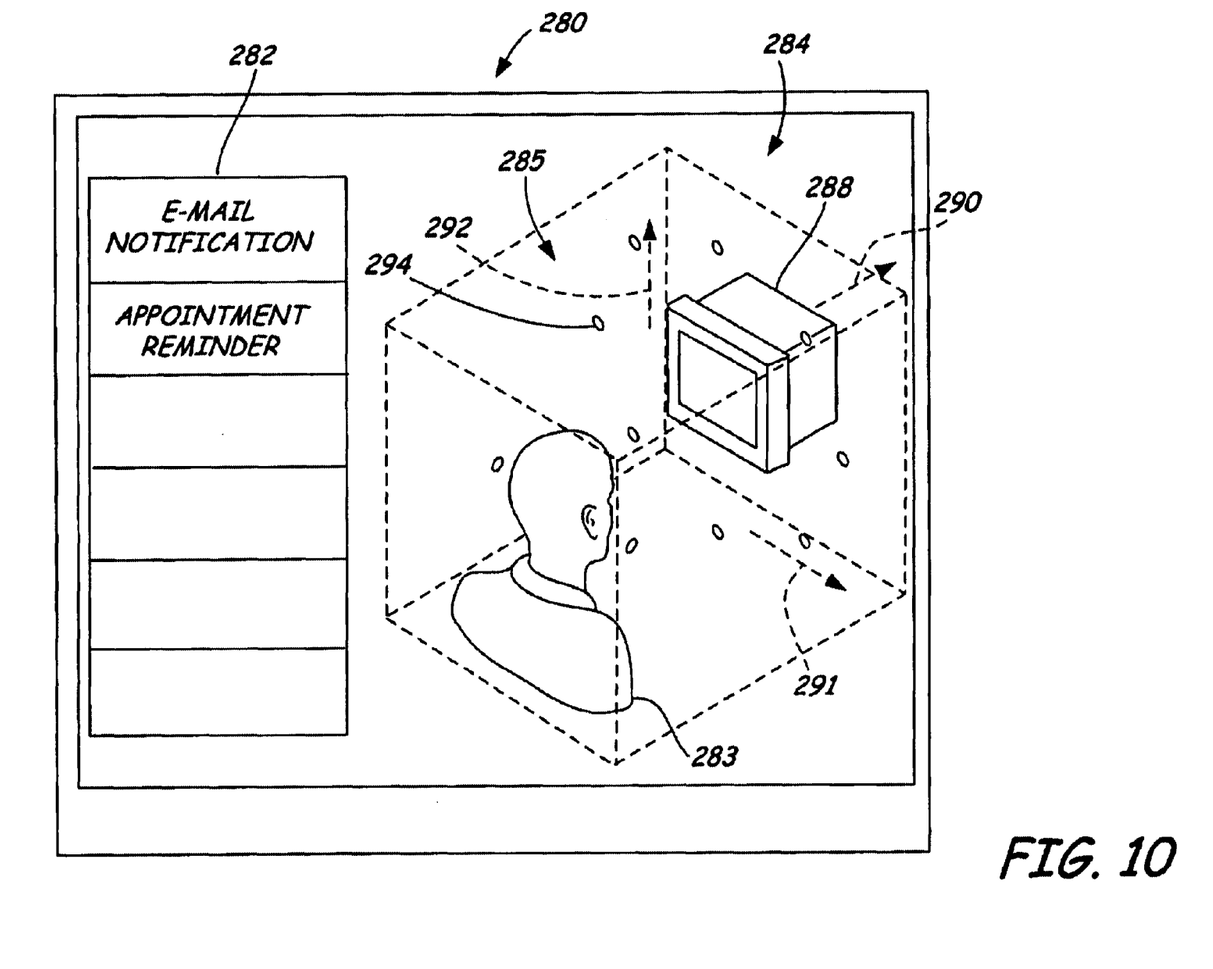
FIG. 10 is a pictorial illustration of an interface for moving simulated sound sources.

FIG. 10 illustrates a graphical interface 280 that allows a user to adjust the location of simulated sound sources generated by the computer 4. Generally, the, graphical interface 280 includes a list of system events 282, and a representation 284 of a user 283 with the approximate position of simulated sound sources 285. In the embodiment illustrated, the representation 284 is a three-dimensional representation; however, a two-dimensional representation can also be used. If a two-dimensional representation is used, different views can be provided so as to allow adjustment of the simulated sound sources in three dimensions.

In the embodiment illustrated, the graphical representation 284 includes the representation of the user 283 and a representation of a monitor 288. Axes 290, 291 and 292 are mutually perpendicular to each other and are provided in order to help to define the three dimensional space. Preferably, the graphical representation 284 is rotatable about each of the axes 290–292 in order to allow different views.

In one exemplary embodiment, the user selects from the list of system events 282 a simulated sound source such as "e-mail notification" to adjust. In the graphical representation 284, an indicator 294 is brought to the attention of the user for example by flashing or changing color. If desired, an audible indication can be generated by the speakers of the computer so as to generate the simulated sound source in the 3D space around the user in order to identify its approximate position relative to the user. Using a pointer device such as a mouse, the user can then move the indicator 294 of the simulated sound source to a new position relative to the graphical representation 184 of the user. When the user has moved the indicator 294 to its new position, the computer can generate an audible indication of the new position of the simulated sound source in the space around the user.

If desired, suitable dialog boxes can be provided so as to allow the user to also change audible characteristics such as the frequency or duration of a simulated sound source in addition to changing its position relative to the user.

Figure 11:
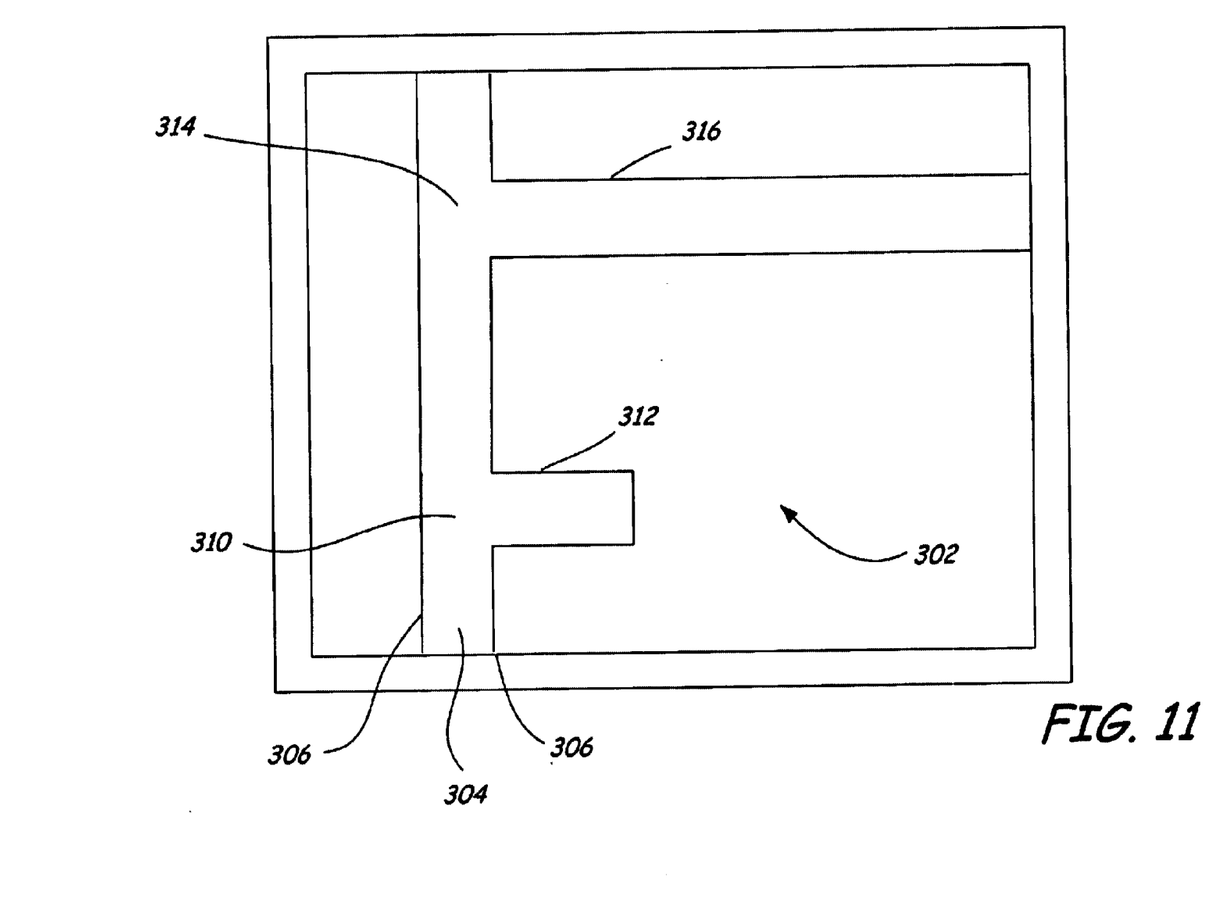
FIG. 11 is a pictorial illustration of a maze.

FIG. 11 illustrates another aspect of the present invention. This aspect of the present invention includes a computer game wherein the monitor is darkened or dimly lit. For example, FIG. 11 illustrates a portion of a maze 302 wherein the user is represented at 304. Walls of the maze 302 are indicated at 306. As the user operates an input device such as a joystick, the user traverses the maze 302. However, the user does riot receive any visual feedback of his or her position within the maze 302, but rather, primarily relies on other non-visual feedback. Non-visual feedback includes simulated sound of the user traversing the maze 302. For instance, as the user simulates walking down a corridor of the maze 302, simulated sound of the user is generated through the speakers of the computer. For example, the sound of the user's footsteps reflecting off the walls 306 can be generated. In the position 304 illustrated in FIG. 11, the use would hear sound reflected off the walls 306 on either side of the user at approximately the same amplitude. However, when the user reaches a position 310, the user may hear a reduced amplitude on the right side to signify that a short corridor 312 is present. Likewise, when the user reaches a position 314, the user may not hear any sound on his or her right side due to the presence of a long corridor 316. If desired, other non-visual feedback such as a force feedback device, such as a joystick that provides tactile sensations to simulate the user bumping into walls of the maze 302, can also be provided. Again, the user primarily navigates the maze 302 using non-visual feedback where the monitor is darkened or provides only a very dim visual image.

Although the present invention has been described with reference to preferred embodiments, workers skilled in the art will recognize that changes may be made in form and detail without departing from the spirit and scope of the invention.

What is claimed is:

1. A computer readable medium having instructions readable by a processor which, when implemented, cause the processor to handle data and provide information to a computer user comprising:

displaying separate visual cues of the information on a computer monitor, each visual cue associated with a simulated sound source that corresponds to a separate application;

processing data corresponding to each visual cue;

displaying a graphical representation of the simulated sound sources and at least one of the user and the monitor;

adjusting the location of the simulated sound sources depending on input from the user by altering a location of the graphical representation; and generating a simulated sound source as a function of the process data and the location of the graphical representation for each separate visual cue displayed on the computer monitor, wherein the simulated sound sources are spaced apart from each other about the computer user.

2. The computer readable medium of claim 1 and further comprising displaying a graphical representation of the user.

3. The computer readable medium of claim 2 wherein each graphical representation is three-dimensional.

4. The computer readable medium of claim 1 and further comprising displaying a graphical representation of the monitor.

5. The computer readable medium of claim 4 wherein each graphical representation is three-dimensional.

6. The computer readable medium of claim 1 wherein adjusting comprising displaying a list of options corresponding to the simulated sound sources.

7. The computer readable medium of claim 1 wherein the graphical representation is three-dimensional.

8. The computer readable medium of claim 1 wherein the simulated sound sources are spaced-apart from each other in the three dimensional space surrounding the computer user.

9. The computer readable medium of claim 1 wherein the step of generating includes operating three spaced-apart speakers positioned about the computer user.

10. The computer readable medium of claim 1 wherein the step of generating includes operating four spaced-apart speakers positioned about the computer user.

11. The computer readable medium of claim 1 wherein the step of generating includes providing a corresponding signal to a headphone worn by the computer user.

12. The computer readable medium of claim 1 wherein the simulated sound sources are positioned about the computer user to aid the computer user in finding the corresponding visual cue.

13. The computer readable medium of claim 1 wherein the simulated sound sources are spaced-apart from each other in the three dimensional space surrounding the computer user.

* * * * *